United States Patent [19]

Weisberg

[11] 4,176,567

[45] Dec. 4, 1979

[54] METHOD OF MAKING A TEAR LINE-FORMING PERFORATION IN A SEALED MARGINAL PORTION OF A BAG AND A SEALED BAG FORMED THEREBY

[76] Inventor: Warren Weisberg, 2406 Grant, Evanston, Ill. 60201

[21] Appl. No.: 901,932

[22] Filed: May 1, 1978

Related U.S. Application Data

[62] Division of Ser. No. 779,033, Mar. 18, 1977, abandoned.

[51] Int. Cl.$^2$ ............................................. B26F 1/18
[52] U.S. Cl. ........................................ 83/30; 83/660; 83/697
[58] Field of Search ......................... 83/30, 660, 697; 206/620, 632

[56] References Cited

U.S. PATENT DOCUMENTS

| 27,934 | 4/1860 | Steinmitz | 83/660 |
| 134,214 | 12/1872 | Mellor | 83/660 |
| 2,142,728 | 1/1939 | Kienzle | 83/660 X |
| 2,145,725 | 1/1939 | Jamieson | 83/660 X |

Primary Examiner—J. M. Meister
Attorney, Agent, or Firm—Wallenstein, Spangenberg, Hattis & Strampel

[57] ABSTRACT

A unique preferably Y-shaped tear line-forming perforation is formed in the sealed marginal portion of a flat bag made of confronting panels of synthetic plastic material sealed together at marginal portions thereof. The perforation is formed with a unique bag-puncturing tool having a faceted, tapered tool head having preferably only three straight longitudinally extending bag-cutting edges converging to a bag-puncturing point at the end of the tool head. The sealed bag is placed against a support wall having a tool-receiving aperture therein and the bag-puncturing point of the tool head is positioned outside of the inner margin of a sealed marginal portion of the bag and pushed through the bag into the aperture of the support wall with an orientation which produces a Y-shaped perforation outside of said inner margin with one leg of the perforation extending from the point of intersection of the legs of the perforation in a direction away from the adjacent edge of the bag to establish a tear line direction which extends into a sealed bag portion to form a desired bag opening by tearing the bag through this tear line-determining leg of the perforation.

8 Claims, 12 Drawing Figures

METHOD OF MAKING A TEAR LINE-FORMING PERFORATION IN A SEALED MARGINAL PORTION OF A BAG AND A SEALED BAG FORMED THEREBY

This is a division of application Ser. No. 779,033, filed Mar. 18, 1977, now abandoned.

The present invention relates to the packaging or products in sealed, generally flat bags made of confronting panels of synthetic plastic material sealed together along two or more of their marginal edges.

More specifically, the invention relates to a unique method for producing a uniquely shaped tear line-producing perforation in the sealed marginal portion of such bags so that the bags may be readily opened by applying finger pressure which tears the bag along a portion of the perforation which determines the direction of the tear line producing thereby.

Various means have been deviced for enabling the ready opening of flat sealed bags made of confronting panels of synthetic plastic material sealed together at their marginal portions thereof. Thus, commonly, V-shaped notches are formed at the edge portions of the bags. The crotch of such notches form a convenient starting point for a tear line. However, such notches have a number of disadvantages, among them being a need for special relatively costly, bulky tools to form such notches. Also, such notches produce flexible edge portions or flaps which sometimes can jam the bag-producing machinery involved. Also, such bags can more easily be torn open undesirably by forces applied to the bags in the handling thereof. Moreover, the notch-producing process results in waste material which must be removed from the bag making machinery involved. The notching and waste removal tools required to form the notches undesirably complicates the machinery used in making the bags.

Other variously shaped tear line-producing perforations have been heretofore formed in the sealed marginal edge portions of flat sealed bags with varying degrees of success. For example, circular holes have been punched into the sealed marginal portions of flat bags, but such holes doe not establish a definite tear line direction, make it more difficult to tear the bag, and produce undesired scrap which cam jam the bag-producing machinery. Also, the synthetic plastic bag material sometimes sticks to the puncturing tool when the tool is withdrawn from the punched bag involved, also causing jamming of the machinery involved.

Accordingly, one of the objects of the present invention is to provide a method for forming a tear line-forming perforation in a sealed marginal portion of a flat bag as described, which minimizes or avoids the bag sticking and other problems just described.

A related object of the invention is to provide a method as just described where the perforation-forming tool can be easily and inexpensively made with loose tolerances and to practically any size. A still further related object of the invention is to provide a method of perforating sealed marginal portions of a flat bag as described, where the perforation-forming tool can be attached to various portions of conventional bag-forming machinery, such as in the heat seal-forming heads or bag severing heads thereof.

SUMMARY OF THE INVENTION

In accordance with one of the aspects of the present invention, a sealed marginal portion of a flat bag as described is punctured by a uniquely shaped tool head having a faceted tapered tool head. The faceted tapered tool head is provided with preferably three and, in any event, not many facets producing a corresponding number of straight, longitudinally extending, bag-cutting edges converging to a bag-puncturing point at the end of the tool head. The facet-forming surfaces between the longitudinal bag-cutting edges of the tool head are preferably concave but, in any event, most advantageously should be non-protruding surfaces, to minimize the area of contact between the bag and tool head when the tool head is forced through the walls of the bag. The sheet material forming the bag to be perforated rests on or is held against a suitable backing surface having an aperture for receiving the tapered tool head as it is forced through the walls of the bag. When the tool head has only three facets, it produces a Y-shaped perforation. The slit-like legs produced by the faceted tool head, produce no waste material. When the bag margin is punctured thereby, the tool head is oriented so that one leg of the perforation extends from the point of intersection of the legs thereof away from the adjacent edge of the bag and toward the sealed compartment of the bag to establish a tear line direction which produces the desired opening thereon. This leg is sometimes referred to as the tear line-determining leg of the perforation. The legs of the perforation pointing away from the interior or the bag form edges for guiding the direction of the tear towards the tear line-determining leg. The perforation is preferably maintained within the edges of the bag so that no weakened areas or flaps are produced at the edge of the bag which can cause jamming or undesired tearing of the bag perimeter.

The perforation-producing tool head described is perferably made of steel, and be easily made to any desired size, so that very small perforations can be formed in even relatively narrow marginal portions of sealed synthetic plastic bags. Also, the tool head can be readily attached to or incorporated as a projection in a heat sealed-forming or bag severing tool head, so that the perforations can be formed simultaneously with the formation of a seal in or severance of the confronting panels of a bag.

The above and other features and advantages of the invention will become apparent upon making reference to the specification to follow the drawings and the claims.

DESCRIPTION OF PREFERRED EMBODIMENTS OF THE INVENTION

Figure 1A:
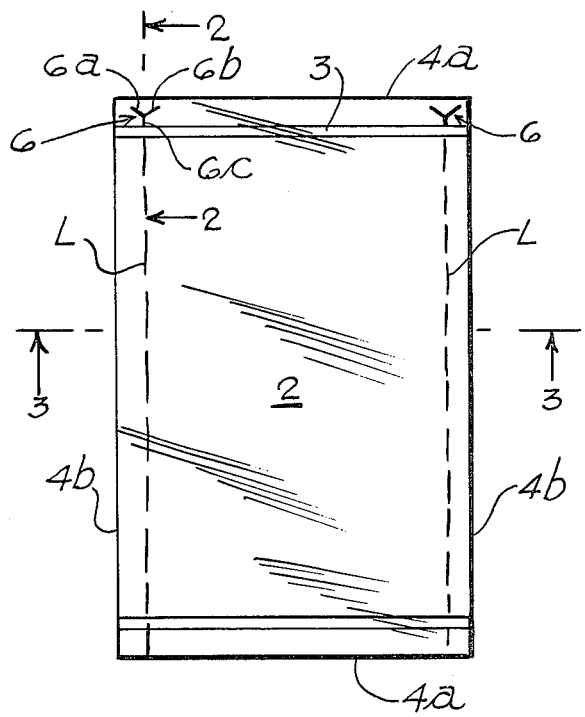
FIG. 1A is a view of a flat bag made from a flattened extruded tube of synthetic plastic material sealed at the ends thereof, and shows unique tear line-forming perforations formed at the upper corners thereof by the method of the present invention.
Figure 1B:
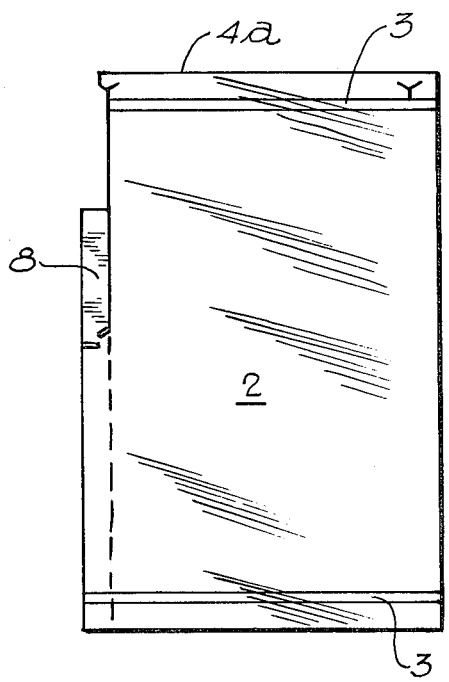
FIG. 1B is a view similar to FIG. 1A showing the bag therein as it is being torn open by use of the tear line-forming perforation oriented to produce a tear line parallel to the longitudinal axis of the bag.
Figure 2:
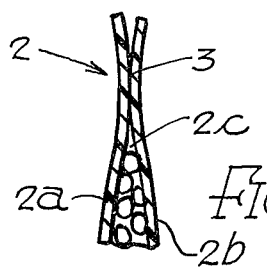
FIG. 2 is a fragmentary enlarged vertical sectional view through the upper sealed end of the bag shown in FIG. 1A, taken along section line 2—2 passing through the center of one of the tear line-forming perforations thereof.
Figure 3:
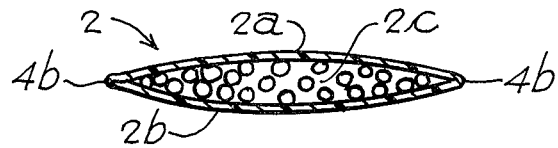
FIG. 3 is a transverse sectional view of the bag shown in FIG. 1A, taken along section line 3—3 therein.

Referring now more particularly to FIGS. 1A, 1B, 2 and 3, the flat bag 2 is thereshown in the form of a flattened tube of extruded synthetic plastic material like polyvinyl chloride, polypropylene or the like, which is most readily tearable in the direction of extrusion thereof (i.e. in the direction of the tube axis). The flattened tube has opposite confronting panels 2a–2b, and the opposite ends of the tube are heat sealed along upper and lower seal lines 3—3 spaced a short distance inwardly of the adjacent margins of the bag to form a sealed compartment 2c (FIG. 3). In the preferred form of the invention, a tear line-forming perforation 6, preferably Y-shaped, is provided outside of the innermost margin of the seal lines 3—3, FIG. 1A showing two such perforations 6—6 in the upper corners of the bag. As illustrated, each of these perforations is formed by three equally angularly spaced legs 6a-6b-6c each forming a continuous slit extending completely through the marginal portion of the bag and intersecting at a common center point. The perforation legs 6a-6b-6c terminate short of the edges 4a—4a and 4b—4b of the bag so that there are no flaps or weakened areas at the edges of the bag formed by the perforations 6—6. The innermost leg 6c of each perforation extends from the point of intersection of the legs 6a-6b-6c in a direction parallel to the adjacent closed side margins 4b of the bag, which is the direction the extruded tube forming the bag is most easily tearable. The extension of each leg 6c, sometimes referred to as the tear line-determining leg, falls along a line L which can constitute a tear line of the bag when the bag is ripped open by applying finger pressure which tears the bag through the perforation 6 involved. When the bag material has no particular direction of weakness unlike an extruded bag, the outermost legs 6a–6b of each perforation guide the gear direction toward the tear line-determining leg 6c of the perforation involved, so that a continuation of the tearing pressure will tear the bag along the associated tear line L to open the bag, as shown in FIG. 1B, which shows a flap 8 formed by the partial tearing of the left marginal portion of the bag.

Figure 4A:
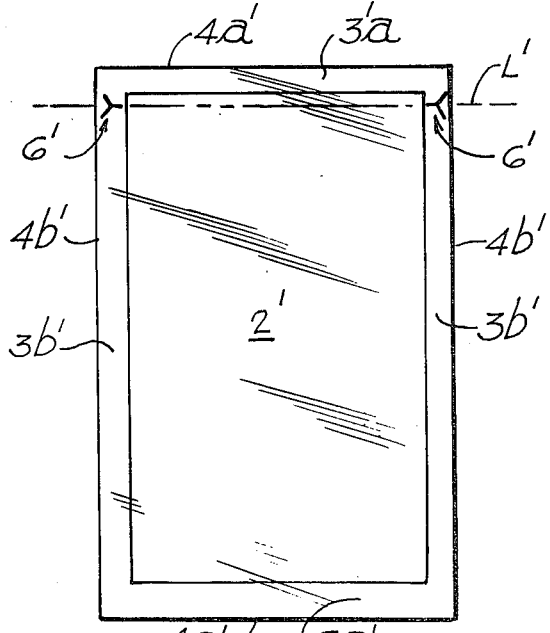
FIG. 4A illustrates a type of flat bag formed by confronting sheets of synthetic plastic material sealed along their entire confronting marginal edges, and further shows the incorporation of the unique tear line-forming perforation of the present invention in each corner of the top of the bag, oriented to produce a tear line extending parallel to the upper edge of the bag.
Figure 4B:
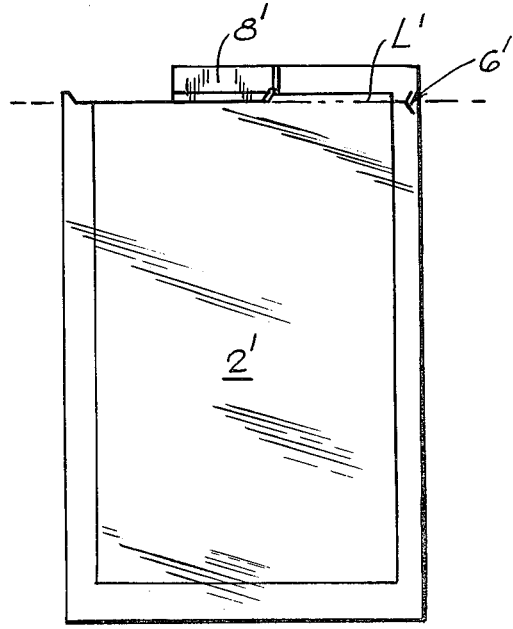
FIG. 4B shows the bag of FIG. 1A being torn-open along a tear line determined by one of the tear line-perforations shown therein.

FIGS. 4A and 4B show a different type of bag 2' initially formed by completely separate panels of synthetic plastic material placed in confronting relationship and sealed along all of their marginal edges to form marginal seal portions 3a'—3a' and 3b'—3b'. When the bag material is Mylar or cellophane or the like, the sealed areas will generally extend to or adjacent the edges of the bag. A pair of Y-shaped perforation 6' similar to the perforation 6 previously described are formed in the upper left end right hand corners of the bag 2', with the innermost tear line-determining legs 6c each perforation falling along a tear line L' extending parallel to the upper edge 4a' of the bag and within the sealed compartment of the bag, so that tearing of the bag along the tear line L' will form a continuous opening in the top of the bag.

Figure 5:
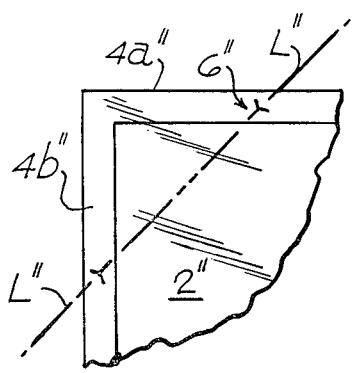
FIG. 5 is a view through a bag of the type shown in FIG. 4A modified in that the tear line-forming perforation is inclined to the adjacent marginal edges of the bag to form a pouring spout at the corner of the bag.

FIG. 5 shows a bag 2" similar to that shown in FIGS. 4A and 4B, except that the tear line-forming perforation 6" shown therein inclines at an angle to the adjacent edges 4a" and 4b" of the bag, so that the extension of the tear line-forming leg 6c" thereof falls along a tear line L" extending across the corner of the bag and into the compartment-forming portion thereof. Accordingly, when the bag is torn by the aid of the perforation 6" along the line L", a pouring spout will be formed in the upper left corner of the bag.

Figure 6:
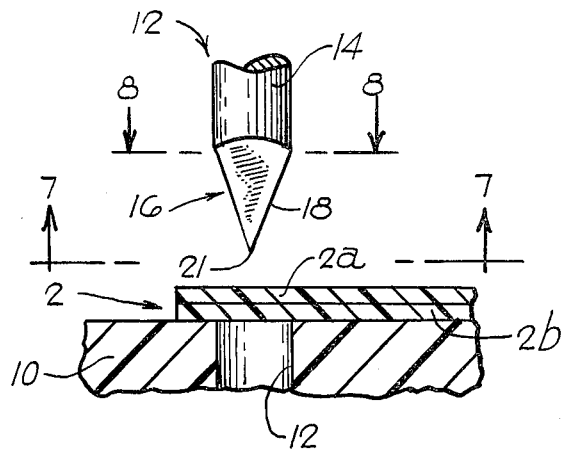
FIG. 6 is a sectional view through the sealed marginal portion of a bag placed upon a support surface having an aperture for receiving the faceted tapered tool head therein shown immediately prior to the puncturing of the bag illustrated.
Figure 7:
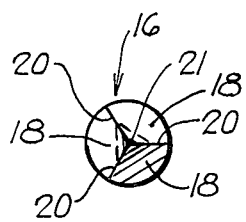
FIG. 7 is a bottom end view of the faceted tapered tool head shown in FIG. 6, as seen along viewing plane 7—7 therein.
Figure 8:
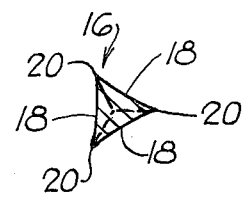
FIG. 8 is an enlarged transverse sectional view through a portion of the faceted tapered tool head shown in FIG. 6, as seen along section line 8—8 therein.

The method by means of which the various tear line-perforations 6, 6' and 6" are formed is shown in FIGS. 6 through 8 to which reference should now be made. In FIG. 6, the bag 2 is shown lying upon a support surface 10 having an aperture 12 slightly greater in size than the cylindrical shank portion 14 of a perforation-forming tool 12 which may be made of any suitable material. The perforation-forming tool 12 has a faceted and outwardly tapering tool head 16 formed in any suitable way, as by grinding three facets 18 therein, forming longitudinal straight cutting edges 20 converging to a common point 21 at the end of the tool head. The facets 18 form surfaces should not protrude beyond a plane extending between the cutting edges 20, to minimize contact between the tool head and the bag material which can cause the bag material to stick to the tool head. The bag 2 is placed upon the support surface 10 and relates to the faceted tapered tool head 16 so that when the tool head is pushed through the sealed marginal portion 3a of the bag 2 and into the support wall aperture 12 the aforementioned Y-shaped perforations 6, 6' or 6" are formed. The resulting small area of contact between the tool head edges and the bag walls make it unlikely that the bag walls will stick to the tool head 16 when it is withdrawn from the support wall aperture 12 and bag upon completion of the formation of the perforation involved.

Figure 9:
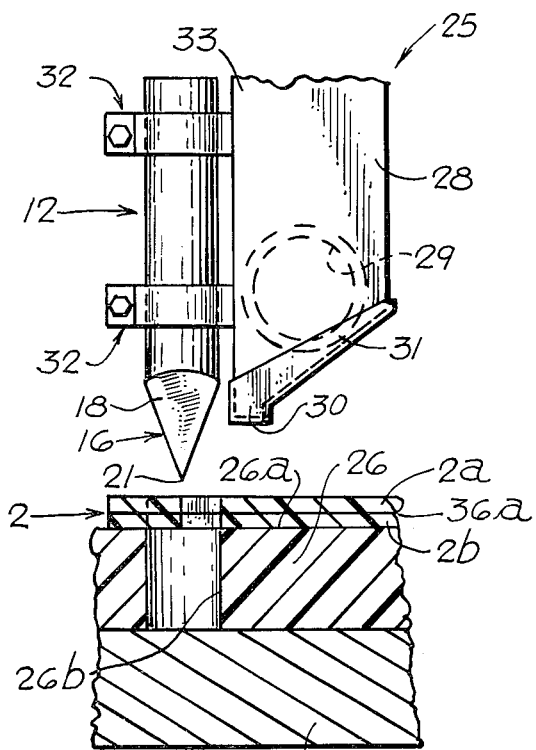
FIG. 9 is a vertical sectional view through a heat sealing head of more or less conventional form to which is attached the tear line-forming tool of the present invention, the sealing head being shown of a type adapted to heat seal bag materials which readily stick to metal surfaces.
Figure 10:
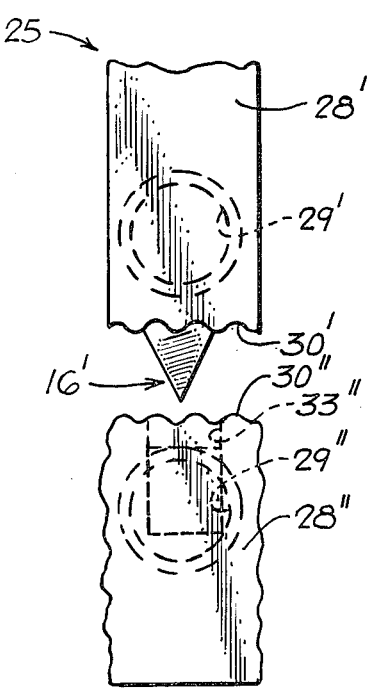
FIG. 10 is a view of a heat sealing head with the tear line-producing tool of the present invention incorporated therein, the heat sealing head shown being of a type adapted to form heat seals in materials which do not readily stick to metal surfaces.

The simplicity of the design of the tool head 16 is such that it can be readily incorporated in a bag cutter device or a seal-forming head, as illustrated by FIGS. 9 and 10, to which reference should now be made.

FIG. 9 shows the incorporation of the perforation-forming tool 12 within a sealing head 25 which forms a seal line 3 in the flattened tubular stock forming the bag 2 shown in FIGS. 1A and 1B. Generally, bags are formed from a continuous web of extruded material unwinding from a roll of the same and passing through various bag-forming and bag-filling station apparatus. Before a bag can be filled, obviously one end of the flattened tubular stock forming the bag involved must be sealed so that a compartment with a sealed bottom is formed therein into which the contents to be sealed can be fed. The sealing head 25 forms the initial seal which forms the sealed compartment in the bag before the same is filled. The flattened tubular web of extruded plastic material is shown supported on a suitable support surface 26a at the bag-sealing station shown in FIG. 9. Extruded plastic materials such as polyvinylchloride, polypropylene, etc. readily stick to metal surfaces and, accordingly, the support surface 26 may be the outer surface of a silicone rubber pad 26 having an aperture 26b sized to receive the tapered tool head 16 when it is forced through the panels 2a-2b which are to form the bag 2. The pad of silicone rubber or the like is shown mounted upon a metal substrate 27.

The sealing head 25 as illustrated includes a metal body or housing 28 having suitable heating means 29 therein for heating the same to a temperature which will evffect a heat sealing operation. The bottom end of the housing 28 has a narrow downwardly projecting heat seal-forming portion 30 defining the area for forming the heat sealing line 3 in FIGS. 1A and 1B. This projecting portion is covered by a suitable layer of material 31 which cam withstand the temperatures involved and isolate the metal of the housing 28 from the panels 2a-2b. Accordingly, the layer of material 31 may be made of a sheet of teflon or the like. The tool 12 may be anchored by straps 32-32 to the housing 28 which has an upper extension 33 connected to suitable reciprocable apparatus (not shown) which moves the sealing head 25 up and down as the web of bag-forming material is moved in step-by-step fashion past the heat sealing station. The tapered tool head 16 is positioned with respect to the heat self-forming projection 30 of the sealing head 25 properly to position the perforation 6 produced thereby as described. The other end of the sealing head 25 (not shown) carried a similar tool 12 to form the other perforation 6 shown in FIGS. 1A and 1B. Thus, when sealing head 25 is lowered to bring the teflon covered heat seal-forming projection 30 of the sealing head 25 against the upper surface of the panel 2a, the tapered tool head 16 will be forced through the panels 2a and 2b into the aperture 26b formed in the silicone rubber pad 26, thereby performing a sealing and perforation-forming operation in a single downward movement of the sealing head 25.

The tool 12 may be associated with other portions of bag-forming machinery, such as the apparatus used to sever a partially or completely sealed bag from the end of the web of synthetic plastic material from which the bags are formed.

If the material out of which the bag is made is one like Mylar, cellophane, and the like which does not readily stick to metal surfaces, the tool head may be incorporated in one of a pair of confronting metal seal-forming members 28'-28" each having suitable heating means 29' or 29" therein as shown in FIG. 10. In this form of the invention, the tapered tool head 16' is a downward projection from the member 28'. The member 28' has a heat seal-forming metal surface 30' which cooperates with a similar heat seal-forming surface 30" of the member 28". The member 28" has an aperture 33' into which the tapered tool head 16' extends when the member 28' is brought doenwardly into heat seal-forming relationship with the other bag-forming panels 2a-2b (not shown). The member 28' may be connected to a suitable motion-imparting means for reciprocating the same up and down at the appropriate time.

It should be understood that numerous modifications may be made in the preferred forms of the invention disclosed without deviating from the broader aspects of the invention.

I claim:

1. A method of making a tear line-forming perforation in a sealed bag made of confronting panels of manually tearable material having marginal portions thereof sealed together to define a sealed compartment within the bag containing a material to be sealed, said method comprising the steps of: providing an outwardly tapering faceted pointed tool head, the faceted tapered pointed tool head being formed by at least three, longitudinal extenting bag material slitting edges converging at a bag-puncturing point at the end of the tool, positioning said bag-puncturing point substantially beyond what is or will be the inner margin of a sealed marginal portion thereof, and forcing the tool head through said bag with an orientation where the bag material slitting edges of the tool head form a multi-legged tear line-forming perforation which terminates outwardly of said inner margin and comprises continuous slits intersecting at a common point with one of the legs of the perforation extending from said common point in a direction away from the adjacent edge of the leg along a line which passes within the sealed portion of the bag, so that the bag is opened when it is torn from the edge thereof through and beyond the latter leg, and then withdrawing the tool head from the punctured bag.

2. The method of claim 1 wherein the surfaces of the faceted tool head between said bag-slitting edges are non-protruding surfaces so as to minimize the area of contact between the bag walls and the tool head.

3. The method of claim 1 wherein bag-slitting edges of the tool head are substantially equally spaced apart.

4. The sealed bag of claim 1 wherein the tool head has only three facets so that there are only three bag-slitting edges on the tapered tool head.

5. The method of claim 3 wherein the tool head has only three facets forming only three equally spaced bag-slitting edges on the tool head, wherein a Y-shaped perforation is formed thereby.

6. The method of claim 1 wherein the tapered tool head has no more than four facets producing no more than four bag-slitting edges intersecting at a common point.

7. The method of claim 5 wherein the surfaces of the faceted tool head between said bag-slitting edges are non-protruding surfaces so as to minimize the area of contact between the bag walls and the tool head.

8. The method of claim 1 wherein the sealed bag which is punctured by said tapered tool head is provided with a backing surface with an aperture of somewhat greater size than the tool head, which aperture receives the tapered tool head as it is forced through the bag.

* * * * *